United States Patent [19]

Poldervaart

[11] Patent Number: 4,817,552
[45] Date of Patent: Apr. 4, 1989

[54] MOORING DEVICE

[75] Inventor: Leendert Poldervaart, La Turbie, France

[73] Assignee: Single Buoy Moorings, Inc., Marly, Switzerland

[21] Appl. No.: 618,386

[22] Filed: Jun. 7, 1984

[30] Foreign Application Priority Data

Jun. 7, 1983 [NL] Netherlands ............... 8302024

[51] Int. Cl.⁴ ............................................. B63B 21/04
[52] U.S. Cl. ....................................... 114/230; 114/219
[58] Field of Search ............... 405/212; 114/219, 230, 114/29 C

[56] References Cited

U.S. PATENT DOCUMENTS

| 2,420,677 | 5/1947 | Peterson | 405/212 |
|---|---|---|---|
| 2,915,879 | 12/1959 | Besse | 114/219 |
| 3,001,371 | 9/1961 | Gilmore, Jr. et al. | 114/230 |
| 3,373,713 | 3/1968 | Hindman et al. | 114/219 |
| 3,430,598 | 3/1969 | Soderberg | 114/230 |
| 3,464,214 | 9/1969 | King | 114/230 |
| 3,486,342 | 12/1969 | Aks | 114/230 |
| 3,695,209 | 10/1972 | Giese | 114/230 |
| 3,901,040 | 8/1975 | Sandberg | 114/219 |
| 4,446,806 | 5/1984 | Loire | 114/219 |
| 4,480,576 | 11/1984 | Mills | 114/230 |

FOREIGN PATENT DOCUMENTS

| 1053420 | 3/1959 | Fed. Rep. of Germany | 114/219 |
|---|---|---|---|
| 7614397 | 12/1976 | Netherlands | 114/219 |
| 8202334 | 8/1982 | Netherlands | 114/230 |
| 1312863 | 4/1973 | United Kingdom | 114/219 |
| 2087316 | 5/1982 | United Kingdom | 114/219 |

Primary Examiner—Joseph F. Peters, Jr.
Assistant Examiner—Edwin L. Swinehart
Attorney, Agent, or Firm—Young & Thompson

[57] ABSTRACT

Mooring device consisting of a fixedly erected or floating installation, such as a quay, pier or ship. At least one position or side thereof is provided with structure for mooring a ship thereto and with one or more fenders for resiliently absorbing shocks between the quay and the ship to be moored. Each fender is guided on cables or rods which hang vertically downwards and which are suspended on the outer ends of arms which stand on the installation, such as the quay, and project above water, these cables or rods being loaded by a weight.

1 Claim, 3 Drawing Sheets

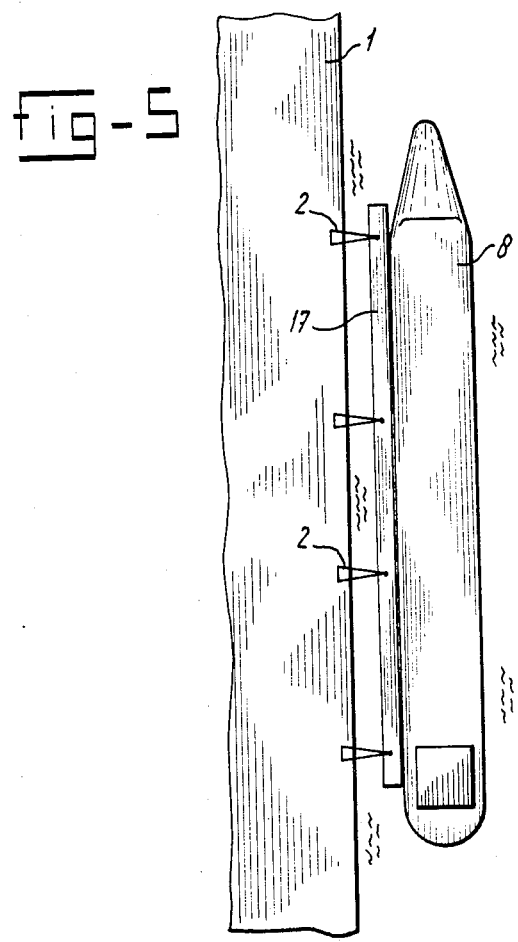
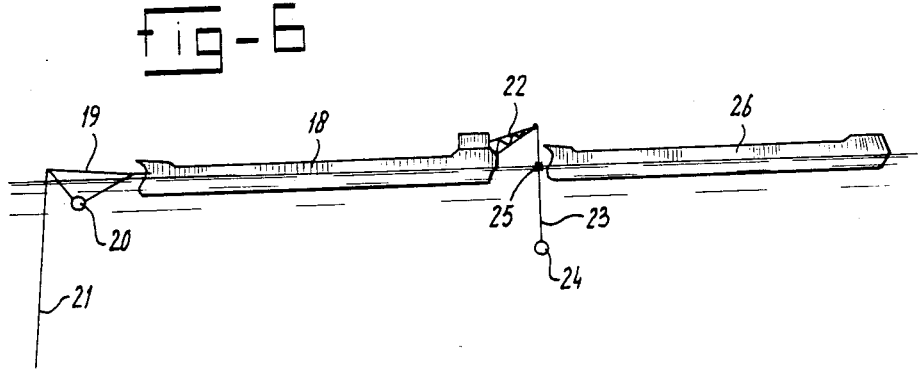

MOORING DEVICE

The invention relates to a mooring device consisting of a fixedly erected or floating installation, such as a quay, pier or ship, with at least one position or side which is provided with means for mooring a ship thereto and with one or more fenders for resiliently absorbing shocks between the quay and the ship to be moored.

The general shape of a mooring device of this type is generally known and consists of a quay or pier or a ship which is provided with a plurality of means for fixing mooring cables thereto, so that a ship to be moored along the side of the quay or the like can be made fast to the device, so-called fenders being used between the quay and the ship to be moored, which fenders absorb the shocks occurring during mooring and the shocks which can arise as a result of the motion of the water. This generally known method of mooring has the disadvantage that, as a result of the restricted capacity of the fenders to absorb shocks, damage to the ship or quay can nevertheless still occur.

The object of the invention is to provide a mooring device which no longer has this disadvantage.

This object is achieved, in accordance with the invention, when the fender or fenders is or are guided on cables or rods which hang vertically downwards and which are suspended on the outer ends of arms which stand on the installation, such as the quay, and project above the water, these cables or rods being loaded by a weight. The fender or fenders is or are then at a distance from the quay or from the ship to which the other ship has to moor, and these fenders are kept at a distance from the side of the quay or the like by means of the cables or rods which are loaded with a weight.

Each fender can possess buoyancy and can therefore already be at the height of the water level, so that it is always in a position which is suitable for absorbing shocks.

The fender can however also be designed without buoyancy and can be adjusted to any desired height below or above the water level by means of a hoisting cable which is brought on board the ship to be moored. This is of course also possible with fenders which possess buoyancy.

A ship which then moors along this mooring device according to the invention will push the fenders in the direction of the quay wall, as a result of which the weights, which are suspended at the bottom end of the guide cables or rods, will be displaced and provide a recoil component, which tends to keep the ship to be moored away from the quay. By this means each movement in the direction of the quay by the ship which is moored or is to be moored is damped by a recoil force which increases as the distance between the quay and the ship decreases.

It becomes possible, by means of the present invention, for the ship to have a great flexibility of movement in relation to the quay without damage to the ship or fender taking place.

Preference is given to weight-loaded guide cables for the fenders in order to avoid conflict with the lower edge of the quay wall. However, if sufficient space is available rods can also be employed.

Furthermore, it is obvious that the arms on which the cables or rods are suspended have to be designed in a manner such that they themselves continue to project above the deck of the ship to be moored. The arms will in practice then consist of derricks whose suspension point for the cables or rods is in a position which is sufficiently high above the surface of the quay and which takes account of the height of the deck and of the superstructure of the ship to be moored.

Each fender, irrespective of whether it possesses buoyancy or not, is preferably provided with a pick-up cable with a buoy, so that the cable can be pulled on board the ship to be moored and can be made fast to a winch or the like so that the fender can be adjusted to the desired height. The fender preferably consists of one or more flexible rings with a central guide for the cable. The fender can however also consist of an oblong body which is guided on at least two cables or rods which are suspended at a distance from one another and which are loaded by a weight.

It is also possible in accordance with the invention to load the cables or rods, on which the oblong fender is guided or on which separate fenders are guided, jointly by a single oblong weight.

The invention will now be described in more detail with reference to the drawings, in which FIG. 1 shows diagrammatically the principle of the invention in the form of a cross-section through a quay and a diagrammatically indicated hull of a ship;

FIG. 5 shows a plan view of the application of a different type of fender;

FIG. 6 shows the application of the principle of the invention to the mooring of a ship by the bow to the stern of another ship.

Figure 1:
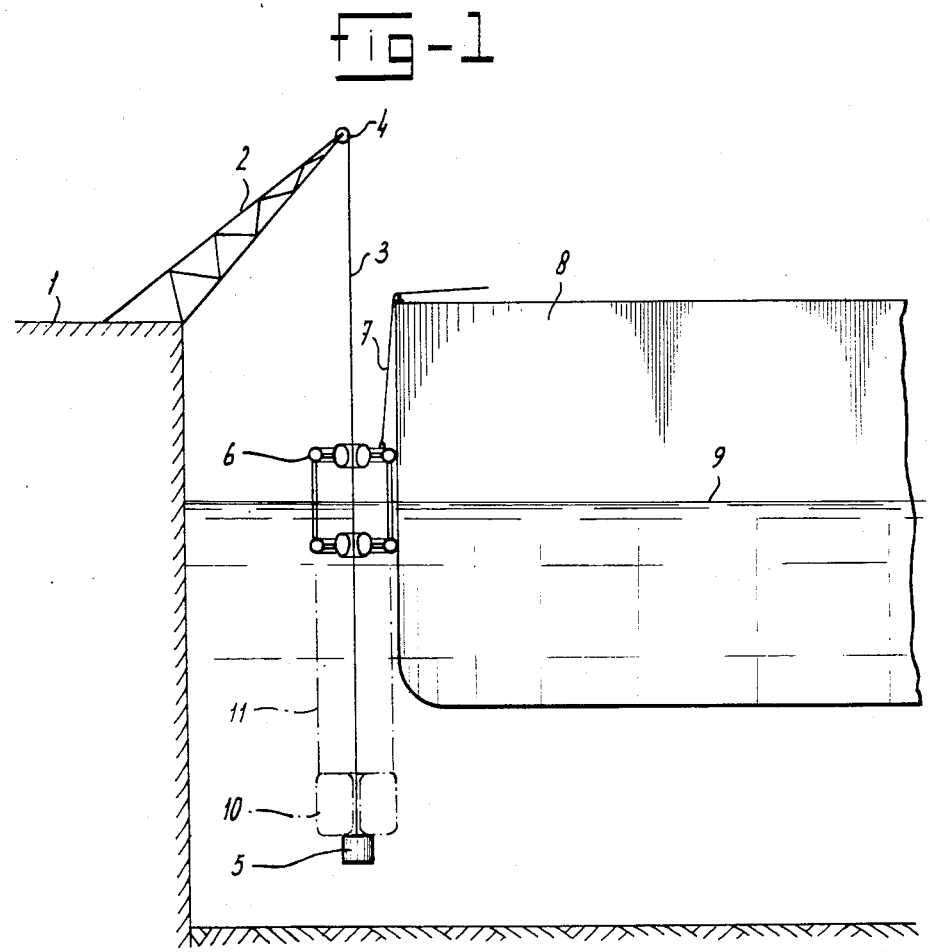
Figure 2:
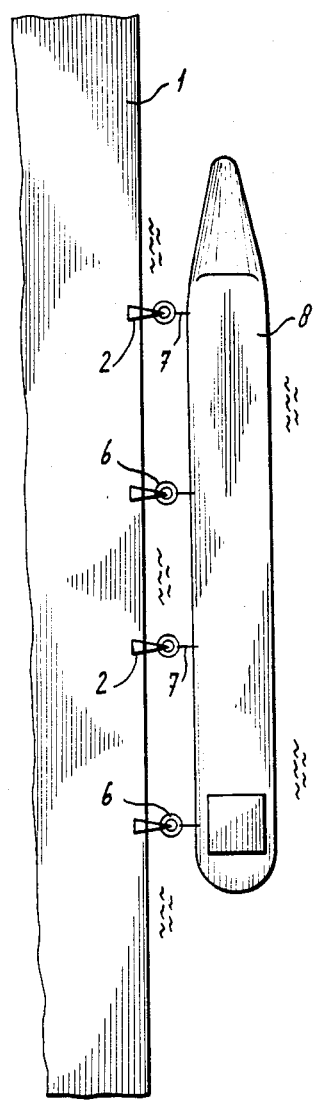
FIG. 2 shows diagrammatically the principle of the invention in a plan view.

FIGS. 1 and 2 shows a quay 1 on which a number of derricks 2 are located at a distance from one another. A cable 3 is suspended on each derrick and is fastened to the outer end 4 of each derrick 2, which end projects above the water, and these cables 3 are each loaded by a weight 5. Fenders 6 are guided on the cables 3, which are made fast to the ship 8 by means of the cable 7.

In FIG. 1 a fender 6 is shown in full lines and floats at the height of the water level 9.

A fender 10, indicated with broken lines, can rest on top of the weights 5 and can be hoisted aboard the ship 8 by means of the hoisting cable 11.

FIG. 2 shows the assembly just before mooring. In the moored state the ship 8 will bear against the fenders 6.

Figure 3:
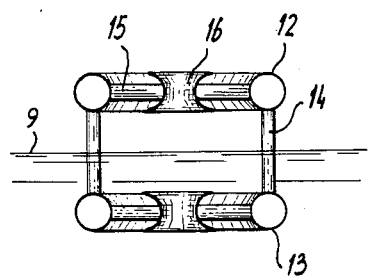
FIG. 3 is a sectional view.
Figure 4:
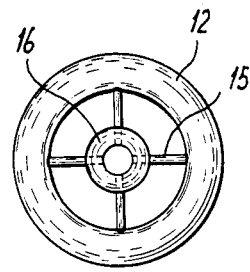
FIG. 4 is a plan view of an embodiment of a fender.

FIGS. 3 and 4 show an embodiment of a fender which possesses buoyancy and consists of resilient rings 12 and 13 which in the vertical direction are coupled to each other by means of pipes 14 and possess inward-directed arms 15 for a central guide 16 for the cables 3.

However any type of fender having a central guide can be used here.

In respect of the possible embodiment of a fender possessing buoyancy shown in FIGS. 3 and 4, it is also possible to use solid fenders which possess no buoyancy or possess controllable buoyancy.

FIG. 5 shows a quay 1 with a ship 8 moored thereto and with support derricks 2 for weight-loaded cables, the derricks standing on the quay and the cables running in the same way as shown in FIG. 1.

In the embodiment as shown in FIG. 5 the fender consists of an oblong body 17 which is guided on the four cables which hang downwards from the four derricks 2. Beneath the fender 17 there are thus separate weights, such as the weights 5 in FIG. 1.

Figure 7:
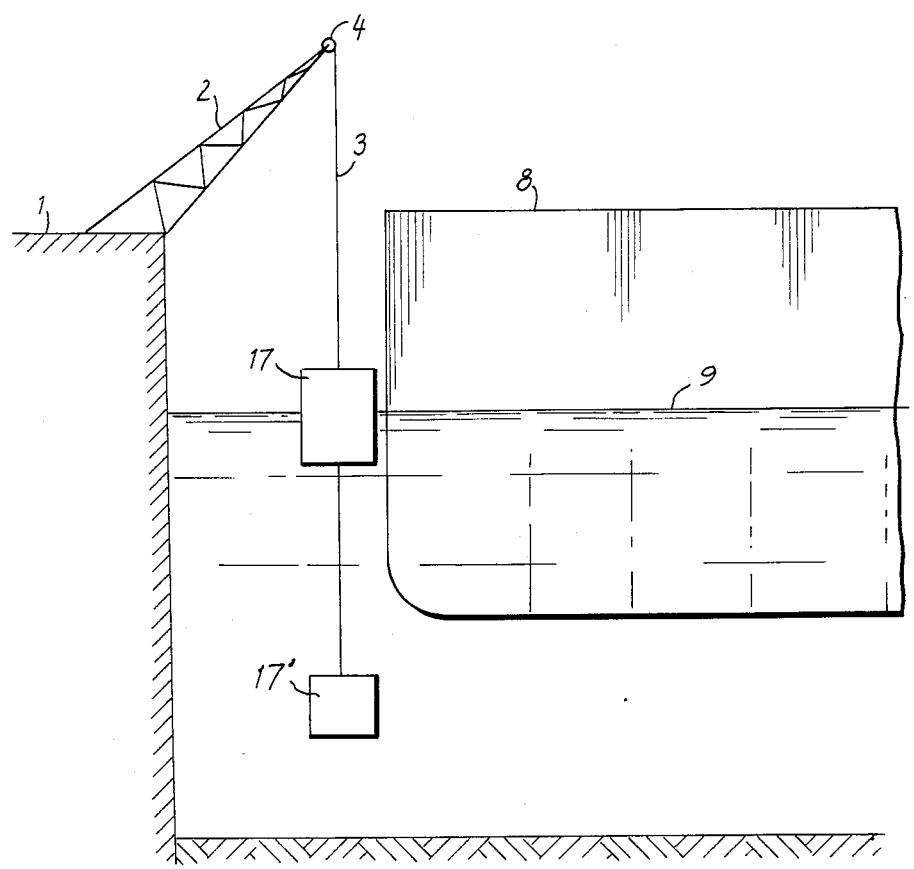
FIG. 7 is a view similar to FIG. 1 but showing another embodiment of the invention.

An embodiment is however also conceivable, as shown in FIG. 7, in which the fender is an oblong fender 17 and in which a single weight 17' is employed which is suspended on the various cables and which essentially resembles the fender 17 in shape, that is to say in length and width.

It is also conceivable for fenders of type 6 or 10 to be used and for the cables of all the derricks 2 to be loaded by a joint weight.

FIG. 6 shows a ship 18 which, via an arm 19, hingedly fixed to the ship 18, with a float 20, is fastened in a known manner to a tension-proof connection 21 of which the lower end is hingedly fixed to a ground anchor (not shown).

This ship now has, in accordance with the invention, a number of arms 22 which project astern and on which cables 23 are suspended with weights 24 or with a single weight which loads and connects the two cables. A fender 25 is again guided on these cables 23, which can have any desired shape which is matched to the form of the bow of the ship 26 to be moored and which can be adjusted, with further hoisting means (not shown), to the desired height by means of cables fastened to the fenders 25, which cables are brought aboard the ship 26.

In all the embodiments shown, the fenders are coupled by means of cables to the ship which is moored or is to be moored and are thus held thereby against the hull of the ship.

The means for adjusting the height of the fender or fenders can however also consist of hoisting means which are operated from the derricks 2.

I claim:

1. A mooring device comprising a structure to which a vessel is to be moored, an arm extending out from said structure over a body of water, an elongated flexible member extending down from the arm at a distance from said structure and terminating below the surface of said body of water, a weight on said elongated flexible member below the surface of the body of water, and a fender disposed on the elongated flexible member spaced a substantial distance above the weight for vertical movement relative to the elongated flexible member, the elongated flexible member being flexible above and below the fender, the fender having means to adjust its elevation relative to the elongated flexible member to about the level of the surface of the body of water, said elongated flexible member and said fender being so disposed that when the elongated flexible member hangs straight down from the arm, the fender is spaced a substantial distance from said structure, the arm and the elongated flexible member and fender being so disposed that a vessel can push the fender against said structure whereupon the elongated flexible member between the arm and the fender occupies a position inclined from the vertical and the weight tends to return the elongated flexible member to a vertical position thereby to push the vessel away from said structure to which the vessel is moored, there being a plurality of said elongated flexible members, the fender comprising an elongated body which is guided on said plurality of elongated flexible members, said weight being a single elongated weight that loads all said elongated flexible members.

* * * * *